US008237699B2

(12) United States Patent
Hong et al.

(10) Patent No.: US 8,237,699 B2
(45) Date of Patent: Aug. 7, 2012

(54) APPARATUS AND METHOD FOR DATA INTERFACE OF FLAT PANEL DISPLAY DEVICE

(75) Inventors: Jin Cheol Hong, Gumi-si (KR); Sung Chul Ha, Gumi-si (KR); Chang Hun Cho, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 816 days.

(21) Appl. No.: 12/318,024

(22) Filed: Dec. 19, 2008

(65) Prior Publication Data

US 2009/0167750 A1 Jul. 2, 2009

(30) Foreign Application Priority Data

Dec. 31, 2007 (KR) ........................ 10-2007-0141427

(51) Int. Cl.
*G06F 3/038* (2006.01)

(52) U.S. Cl. ....................................................... 345/213

(58) Field of Classification Search .......... 345/204–215; 713/500–503

See application file for complete search history.

(56) References Cited

U.S. PATENT DOCUMENTS

| | | | | |
|---|---|---|---|---|
| 4,485,378 | A * | 11/1984 | Matsui et al. | 345/28 |
| 2005/0286643 | A1 * | 12/2005 | Ozawa et al. | 375/242 |
| 2007/0171161 | A1 * | 7/2007 | Lin | 345/87 |
| 2009/0051675 | A1 * | 2/2009 | Huang | 345/204 |

FOREIGN PATENT DOCUMENTS

WO WO 2007/035014 3/2007

* cited by examiner

*Primary Examiner* — Liliana Cerullo

(74) *Attorney, Agent, or Firm* — McKenna Long & Aldridge LLP

(57) ABSTRACT

An apparatus and method for data interface of a flat panel display device, which is capable of transferring clocks in a state, in which the clocks are embedded in digital data, thereby reducing the number of transfer lines, is disclosed. The apparatus includes a transmitter unit built in a timing controller, to transmit transfer data with an embedding clock embedded between successive pieces of data, and a clock enable signal to indicate the embedding clock, and receiver units respectively built in a plurality of data integrated circuits connected to the timing controller, to separate and detect the embedding clock and the data from the transfer data, in response to the clock enable signal.

4 Claims, 13 Drawing Sheets

APPARATUS AND METHOD FOR DATA INTERFACE OF FLAT PANEL DISPLAY DEVICE

This application claims the benefit of the Korean Patent Application No. P2007-141427, filed on Dec. 31, 2007, which is hereby incorporated by reference for all purposes as if fully set forth herein.

BACKGROUND OF THE INVENTION

1. Field of the Invention

The present invention relates to a flat panel display device, and more particularly, to an apparatus and method for data interface of a flat panel display device, which is capable of transferring clocks in a state, in which the clocks are embedded in digital data, thereby reducing the number of transfer lines.

2. Discussion of the Related Art

As representative flat panel display devices, which display an image using digital data, a liquid crystal display (LCD) device using liquid crystals, a plasma display panel (PDP) using discharge of inert gas, an organic light emitting diode (OLED) display device using OLEDs are known.

Such flat panel display devices are being advanced toward higher resolution and larger size, in order to display an image of higher-quality. In this case, however, an increase in data transfer amount is required. As a result, there may be a problem in that electromagnetic interference (EMI) increases because it is necessary to use a higher data transfer frequency and an increased number of data transfer lines. In particular, the EMI problem may cause an unstable operation of a flat panel display device because EMI may occur mainly at a digital interface between a timing controller and a plurality of data integrated circuits (ICs) in the flat panel display device.

In order to reduce EMI and power consumption during high-speed transfer of data, flat panel display devices use various methods for data interface, together with 6 data buses. For example, flat panel display devices use a data interface method using a differential voltage, for example, a low voltage differential signal (LVDS), mini-LVDS, a reduced swing differential signal (RSDS), etc.

In such a data interface method, data transfer is achieved using a differential voltage between a pair of transfer lines. For this reason, it is necessary to use a pair of transfer lines per one bit of data. As a result, the number of data transfer lines increases, so that distortion of data caused by interference among the data transfer lines increases. For this reason, there is a problem in that it is difficult to design data transfer lines on a printed circuit board (PCB).

Meanwhile, conventional flat panel display devices use a multi-drop system in which a timing controller transfers clocks and data to a plurality of data ICs which, in turn, sequentially sample the transferred data in response to the transferred clocks, respectively, to use the sampled data. In such a multi-drop system, however, there is a problem in that it is difficult to achieve accurate data sampling because clock delay increases as the clock transfer distance from the timing controller increases.

SUMMARY OF THE INVENTION

Accordingly, the present invention is directed to an apparatus and method for data interface of a flat panel display device that substantially obviates one or more problems due to limitations and disadvantages of the related art.

An advantage of the present invention is to provide an apparatus and method for data interface of a flat panel display device, which is capable of transferring clocks in a state, in which the clocks are embedded in digital data, thereby reducing the number of transfer lines.

Another advantage of the present invention is to provide an apparatus and method for data interface of a flat panel display device, which is capable of stably detecting clocks embedded in data, thereby achieving accurate data sampling.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an apparatus for data interface of a flat panel display device includes: a transmitter unit built in a timing controller, to transmit transfer data with an embedding clock embedded between successive pieces of data, and a clock enable signal to indicate the embedding clock; and receiver units respectively built in a plurality of data integrated circuits connected to the timing controller, to separate and detect the embedding clock and the data from the transfer data, in response to the clock enable signal.

The transmitter unit may include a frequency divider for frequency-dividing a dot clock, to supply the embedding clock and the clock enable signal, a serializer for converting pieces of input parallel data into pieces of serial data, embedding the embedding clock between successive ones of the serial data pieces, and supplying the resultant data as transfer data to be supplied to each of the data integrated circuits, and a differential signal transmitter for converting the transfer data and the clock enable signal into differential signals, respectively, and transmitting the differential signals.

The receiver unit may include a differential signal receiver for recovering the transfer data and the clock enable signal, using the differential signals received from the transmitter unit, a clock/data detector for separating and detecting a first clock corresponding to the embedding clock and the serial data from the transfer data, in response to the clock enable signal, a frequency multiplier for multiplying a frequency of the first clock, to output a second clock, and a deserializer for converting the serial data into parallel data, using the second clock, and outputting the parallel data.

In another aspect of the present invention, a method for data interface of a flat panel display device includes: frequency-dividing an input clock, thereby generating an embedding clock and a clock enable signal to indicate the embedding clock; converting pieces of parallel data into pieces of serial data, embedding the embedding clock between successive ones of the serial data pieces, and supplying the resultant data as transfer data; converting the transfer data and the clock enable signal into differential signals, respectively, and transmitting the differential signals; recovering the transfer data and the clock enable signal, using the transmitted differential signals; separating and detecting a first clock corresponding to the embedding clock and the serial data from the recovered transfer data, in response to the recovered clock enable signal; multiplying a frequency of the first clock, thereby outputting a second clock; and converting the serial data into parallel data, and outputting the parallel data.

In another aspect of the present invention, an apparatus for data interface of a flat panel display device includes: a transmitter unit built in a timing controller, to transmit transfer data with an embedding clock embedded between successive pieces of data; and receiver units respectively built in a plurality of data integrated circuits connected to the timing controller, to generate a clock mask signal, using the transfer data, and to separate and detect the embedding clock and the data from the transfer data, in response to the clock mask signal.

The transmitter unit may include a frequency divider for frequency-dividing a dot clock, to supply the embedding clock, a serializer for converting pieces of input parallel data into pieces of serial data, embedding the embedding clock between successive ones of the serial data pieces, and supplying the resultant data as transfer data to be supplied to each of the data integrated circuits, and a differential signal transmitter for converting the transfer data into a differential signal, and transmitting the differential signal.

The receiver unit may include a differential signal receiver for recovering the transfer data, using the differential signal received from the transmitter unit, a clock/data detector for separating and detecting a first clock corresponding to the embedding clock and the serial data from the transfer data, in response to the clock mask signal, a frequency multiplier for multiplying a frequency of the first clock, to output a second clock, a deserializer for converting the serial data into parallel data, using the second clock, and outputting the parallel data, and a mask signal generator for generating the clock mask signal, using the first and second clocks.

The transmitter unit may supply the clock-embedded data, as the transfer data, in effective data periods, while supplying only the embedding clock, as the transfer data, in a blank period between successive ones of the effective data periods. The mask signal generator may lock the clock mask signal in an enable state for a mask locking period within the blank period. The clock/data detector may detect the embedding clock embedded in the transfer data in the mask locking period, using the clock mask signal locked in the enable state, and may output the detected embedding clock as the first clock.

The clock/data detector may include a first AND gate for performing an AND-operation on the transfer data and the clock mask signal, to detect the embedding clock in an enable period of the clock mask signal, and outputting the detected embedding clock as the first clock, a NOT gate for inverting the clock mask signal, and a second AND gate for performing an AND-operation on the transfer data and the inverted clock mask signal, to detect the serial data in a disable period of the clock mask signal, and outputting the detected serial data.

Alternatively, the clock/data detector may include a first AND gate for performing an AND-operation on the transfer data and the clock mask signal, to detect the embedding clock in an enable period of the clock mask signal, and outputting the detected embedding clock as the first clock, a counter for counting the second clock when the first clock is input, to generate a data mask signal, and a second AND gate for performing an AND-operation on the transfer data and the data mask signal, to detect the serial data in the enable period of the data mask signal, and outputting the detected serial data.

The mask signal generator may include: a counter for counting the second clock when the first clock is input, to output a count signal; and a timing matching unit for delaying the count signal, and outputting the delayed count signal.

Alternatively, the mask signal generator may include a first mask signal generator for counting the second clock when the first clock is input, to output a first clock mask signal, a first mask signal checker for checking whether or not the first clock mask signal is normal, and outputting the first clock mask signal when it is determined that the first clock mask signal is normal, while outputting an abnormality detect signal, a power-on detector for detecting a power-on point, to output a power-on detect signal, a second mask signal generator for generating and outputting a second clock mask signal when the power-on detect signal or the abnormality detect signal is input, and an OR gate for performing an OR-operation on the first and second clock mask signals, and outputting the resultant signal as the clock mask signal.

The first mask signal checker may count the first clock in an enable period of the first clock mask signal, and determines that the first clock mask signal is normal, when the resultant count value is equal to a reference value, while determining that the first clock mask signal is abnormal, when the resultant count value is different from the reference value.

The second clock mask signal output from the second mask signal generator, when the power-on detect signal or the abnormality detect signal is input, may be maintained in an enable state for a predetermined period, and then disabled.

The embedding clock may be embedded, as a preamble signal, in the transfer data before each data piece, together with dummy bits arranged before and after the embedding clock. The clock mask signal may have an enable period existing within a period of the preamble signal while having a width longer than a width of the embedding clock. In particular, the width of the enable period of the clock mask signal may be set to about 2 times of a width of the embedding clock.

In another aspect of the present invention, a method for data interface of a flat panel display device includes: a transmission procedure of transmitting transfer data with an embedding clock embedded between successive pieces of data; and a reception procedure of receiving the transfer data, generating a clock mask signal, based on the received transfer data, and separating and detecting the embedding clock and the data from the received transfer data, in response to the clock mask signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
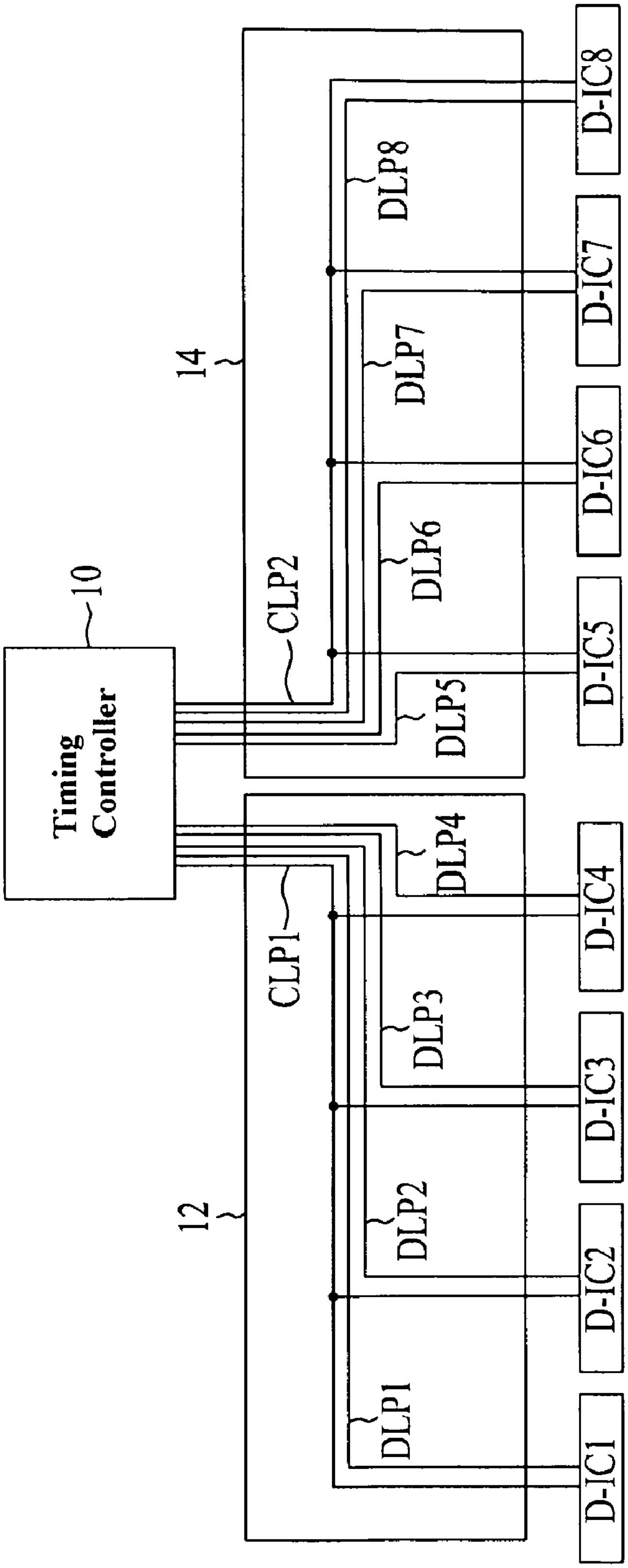
FIG. 1 is a block diagram schematically illustrating an apparatus for data interface of a flat panel display device in accordance with an exemplary embodiment of the present invention.

FIG. 1 is a block diagram schematically illustrating an apparatus for data interface of a flat panel display device in accordance with a first embodiment of the present invention.

The data interface apparatus of the flat panel display device shown in FIG. 1 includes a timing controller 10, and a plurality of data integrated circuits (ICs) D-IC1 to D-IC8 for driving data lines of a display panel included in the flat panel display device under the control of the timing controller 10.

The timing controller 10 is connected to the data ICs D-IC1 to D-IC8 via a plurality of data transfer line pairs DLP1 to DLP8 in a point-to-point manner, respectively. The data ICs D-IC1 to D-IC8 are grouped into two groups, namely, a first group including the data ICs D-IC1 to D-IC4 and a second group including the data ICs D-IC5 to D-IC8. Similarly, the data transfer line pairs DLP1 to DLP8 are grouped into two groups, namely, a first group including the data transfer line pairs DLP1 to DLP4 and a second group including the data transfer line pairs DLP5 to DLP8. The first-group data transfer line pairs DLP1 to DLP4 connect the first-group ICs D-IC1 to D-IC4 to the timing controller 10, respectively, whereas the second-group data transfer line pairs DLP5 to DLP8 connect the second-group ICs D-IC5 to D-IC8 to the timing controller 10, respectively. The first-group data transfer line pairs DLP1 to DLP4 are arranged on a first printed circuit board (PCB) 12, whereas the second-group data transfer line pairs DLP5 to DLP8 are arranged on a second PCB 14. The timing controller 10 embeds clocks in data, and transfers the clock-embedded data to the data ICs D-IC1 to D-IC8 via the data transfer line pairs DLP1 to DLP8, respectively. Accordingly, it is unnecessary to use separate clock transfer line pairs. The timing controller 10 converts the clock-embedded transfer data into a differential signal having the form of a low voltage differential signal (LVDS) or mini-LVDS, and transfers the differential signal in a serial manner. Accordingly, each of the data transfer line pairs DLP1 to DLP8 includes only two transfer lines for supplying differential signals.

In order to enable the data ICs D-IC1 to D-IC8 to stably detect clocks, the timing controller 10 also supplies a clock enable signal to indicate the clocks embedded in the transfer data. The clock enable signal output from the timing controller 10 is supplied in common to the first-group data ICs D-IC1 to D-IC4 via a first enable transfer line pair CLP1 arranged on the first PCB 12. The clock enable signal is also supplied in common to the second-group data ICs D-IC5 to D-IC8 via a second enable transfer line pair CLP2 arranged on the second PCB 14. In other words, the clock enable signal output from the timing controller 10 may be supplied to both the first-group data ICs D-IC1 to D-IC4 and the second-group data ICs D-IC5 to D-IC8 in a multi-drop manner. Alternatively, the clock enable signal may be independently supplied to the data ICs D-IC1 to D-IC8 via enable transfer line pairs (not shown) connected to the data ICs D-IC1 to D-IC8 in a point-to-point manner.

Each of the data ICs D-IC1 to D-IC8 recovers original transfer data from the differential signal independently received via the corresponding data transfer line pair DLP, in accordance with the voltage polarity of the received differential signal, and then separates and detects a first clock and data from the recovered transfer data. Thereafter, the data IC multiplies the frequency of the detected first clock, to recover a second clock. Using the recovered second clock, the data IC samples the data, and then latches the sampled data. Using the latched data, the data IC then drives corresponding data lines. In particular, the data ICs D-IC1 to D-IC8 independently detect clocks from the received data in response to the clock enable signal from the timing controller, to independently use the detected clocks. Accordingly, it is possible to avoid erroneous data sampling caused by a failure of clock detection, a clock delay, or an increase in data transfer frequency in the data ICs D-IC1 to D-IC8.

Figure 2:
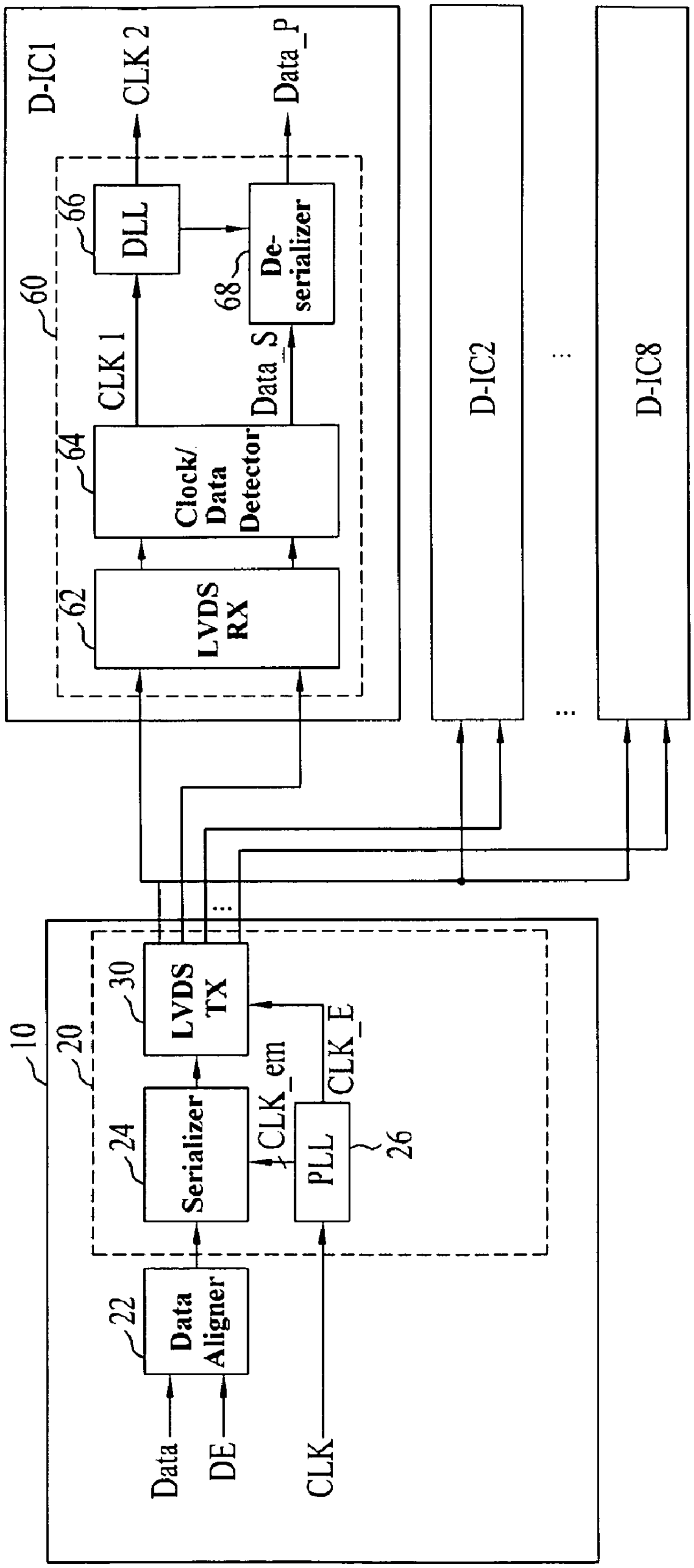
FIG. 2 is a block diagram illustrating a timing controller and data driving integrated circuits (ICs) shown in FIG. 1.
Figure 3:
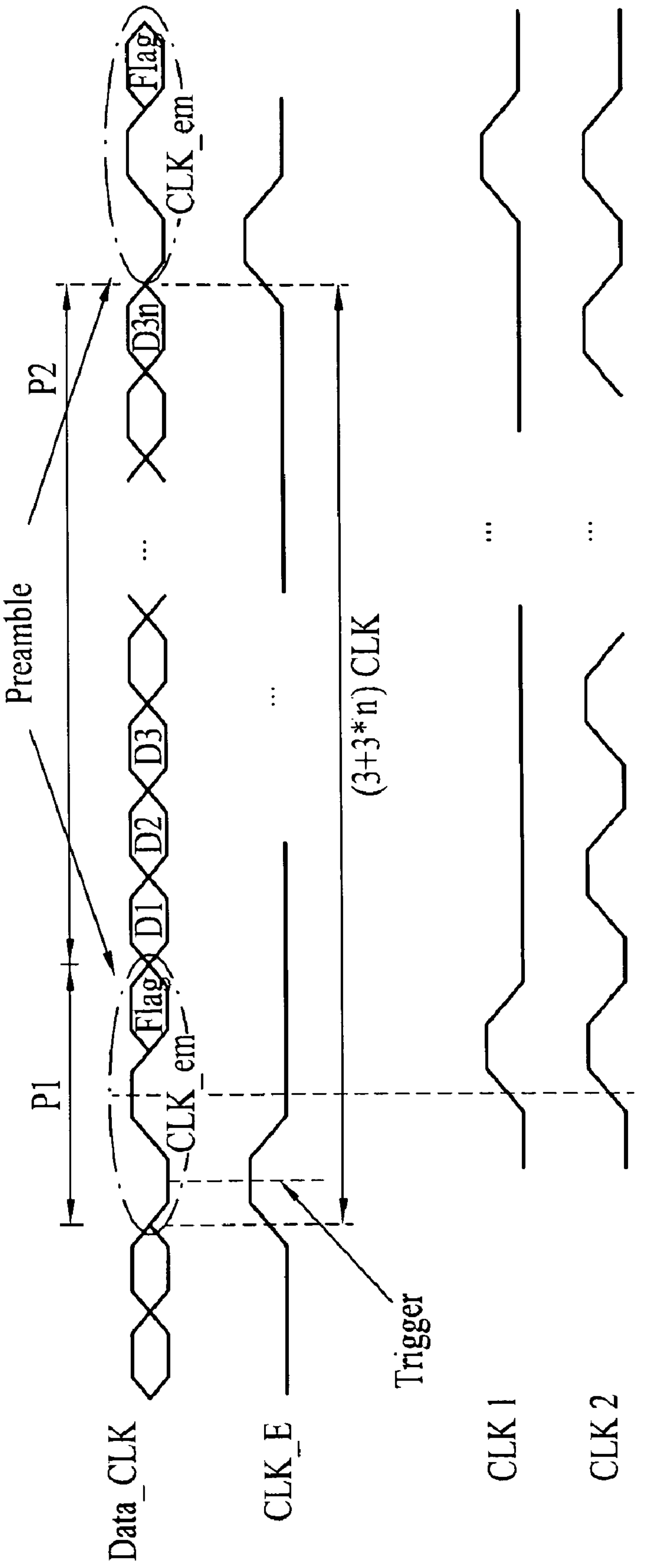
FIG. 3 is a waveform diagram illustrating waveforms of signals in a driving operation of the data interface apparatus shown in FIG. 2.

FIG. 2 is a block diagram illustrating an internal circuit of the data interface apparatus shown in FIG. 1. FIG. 3 is a waveform diagram illustrating waveforms of signals mainly used in a driving operation of the data interface apparatus shown in FIG. 2.

The data interface apparatus shown in FIG. 2 includes a transmitter unit 20 including a serializer 24 and a phase locked loop (PLL) 26 built in an output stage of the timing controller 10, to embed clocks in data, and thus to transfer the clock-embedded data, and receiver units 60 each including a clock/data detector 64, a delay locked loop (DLL) 66, and a deserializer 68 built in an input terminal of a corresponding one of the data ICs D-IC1 to D-IC8, to separate the clocks and data from the data received from the transmitter unit 20. The transmitter unit 20 also includes an LVDS transmitter 30 for converting the clock-embedded data and a clock enable signal CLK_E into differential signals, respectively, and outputting the differential signals. Each receiver unit 60 also includes an LVDS receiver 62 for recovering the clock-embedded data and the clock enable signal CLK_E from the differential signals received from the transmitter unit 20, and outputting the recovered data and signal.

A data aligner 22, which is included in the timing controller 10, aligns pieces of digital data input in respective enable periods of a data enable signal DE, and outputs the aligned digital data to the transmitter unit 20. In particular, where the transmitter unit 20 transfers data in a point-to-point manner, the data aligner 22 sorts the digital data pieces as data to be supplied to respective data ICs D-IC1 to D-IC8, and the sorted digital data to the serializer 24 of the transmitter unit 20.

The PLL 26, which functions as a frequency divider, frequency-divides an input dot clock CLK by a predetermined value, to generate an embedding clock CLK_em to be embedded in the transfer data, and supplies the generated embedded clock CLK_em to the serializer 24. The PLL 26 also generates the clock enable signal CLK_E, which indicates whether or not the embedding clock CLK_em exists, and supplies the generated clock enable signal CLK_E to the LVDS transmitter 30. The clock enable signal CLK_E precedes the embedding clock CLK_em by one clock, to indicate whether or not the embedding clock CLK_em exists, as shown in FIG. 3. Alternatively, the PLL 26 may generate the clock enable signal CLK_E by frequency-dividing the dot clock CLK. In this case, the PLL 26 may generate the embedding clock CLK_em by delaying the generated clock enable signal CLK_E by one clock.

The serializer 24 converts data transferred from the data aligner 22 in a parallel manner into serial data, embeds the embedding clock CLK_em received from the PLL 26 in the serial data, and then supplies the resultant data to the LVDS transmitter 30. In this case, the serializer 24 converts pieces of parallel data input in a separate state while corresponding to respective data ICs D-IC1 to D-IC8 into pieces of serial data, respectively, embeds the embedding clock CLK_em from the PLL 26 between successive ones of the serial data pieces, and supplies the resultant data to the LVDS transmitter 30.

For example, the serializer 24 embeds a preamble signal including the embedding clock CLK_em in a period P1 preceding a period P2, in which bits D1 to D3*n* of one pixel data are serially transferred, and then sequentially supplies the preamble signal and the pixel data bits D1 to D3*n*, as in the case of transfer data Data_CLK shown in FIG. 3. The pixel data may include data of three sub-pixels, namely, red (R), green (G), and blue (B) or may include data of one sub-pixel. Thus, the pixel data is not limited to a specific unit. The preamble signal includes the embedding clock CLK_em, and at least one dummy bit, namely, at least one low ("0") bit, to distinguish the embedding clock CLK_em from the pixel data. The dummy bit precedes the embedding clock CLK_em. The preamble signal may further include a flag signal arranged between the embedding clock CLK_em ("1") and the first bit D1 of the pixel data, to indicate whether or not data exists. When the flag signal has a value of "1", this may represent that data following the flag signal is pixel data. On the other hand, when the flag signal has a value of "0", this may represent that data following the flag signal is a data control signal to control each data IC D-IC. The data control signal may include a source output enable signal SOE for controlling the data output period of each data IC D-IC, a polarity control signal POL for controlling the polarity of output data, a charging sharing control signal CSC for controlling charging sharing of data lines, etc. The flag signal may also be used as a source start pulse SSP. Where data of each of R, G, and B sub-pixels consists of n bits, pixel data of 3*n bits is serially transferred in a data transfer period P2, and a preamble signal of 3 bits is serially transferred in a preamble period P1 preceding the data transfer period P2, the clock enable signal CLK_E is enabled at intervals of 3*3*n CLKs, to indicate respective embedding clocks CLK_em.

The LVDS transmitter 30 converts pieces of transfer data Data_CLK respectively corresponding to the data ICs D-IC1 to D-IC8 from the serializer 24 into differential signals, and supplies the differential signals to the data ICs D-IC1 to D-IC8, respectively. The LVDS transmitter 30 also converts the clock enable signal CLK_E from the PLL 26 into a differential signal, and supplies the differential signal in common to the data ICs D-IC1 to D-IC8. Alternatively, the LVDS transmitter 30 may supply the differential signal converted from the clock enable signal CLK_E to the data ICs D-IC1 to D-IC8 in an independent manner.

The LVDS receiver 62 of the receiver unit 60 in each of the data ICs D-IC1 to D-IC8 detects the voltage polarity of each differential signal received from the transmitter unit 30 of the timing controller 10, to recover the transfer data Data_CLK and clock enable signal CLK_E, and outputs the recovered transfer data Data_CLK and clock enable signal CLK_E.

The clock/data detector 64 of the receiver unit 60 detects the first clock CLK1 and serial data Data_S from the transfer data Data_CLK, in response to the clock enable signal CLK_E from the LVDS receiver 62. That is, the clock/data detector 64 detects the embedding clock CLK_em from the transfer data Data_CLK, using the clock enable signal CLK_E as a trigger signal, and outputs the detected embedding clock CLK_em as the first clock CLK1. The clock/data detector 64 also detects the serial data Data_S from the transfer data Data_CLK, using the flag signal included in the transfer data Data_CLK and the clock enable signal CLK_E. The clock/data detector 64 outputs pixel data, using the detected serial data Data_S. The clock/data detector 64 may additionally output a plurality of data control signals.

The DLL 66 of the receiver unit 60, which is a frequency multiplier, multiplies the frequency of the first clock CLK1 from the clock/data detector 64 by a predetermined value, and outputs the resultant signal as the second clock CLK2.

The deserializer 68 of the receiver unit 60 converts the serial data Data_S from the clock/data detector 64 into parallel data Data_P, using the second clock CLK2 from the DLL 66. The deserializer 68 outputs R, G, B pixel data in parallel, using the parallel data Data_P. The deserializer 68 may additionally output a plurality of data control signals.

Each of the data ICs D-IC1 to D-IC8 samples the pixel data output from the corresponding receiver unit 60, using the second clock CLK2 from the receiver unit 60, and latches the sampled data. Using the latched data, the data IC drives the corresponding data lines of the display panel. For example, in the case of a liquid crystal display (LCD) panel, each of the data ICs D-IC1 to D-IC8 converts the latched data into an analog pixel voltage signal, and supplies the analog pixel voltage signal to the corresponding data lines.

Thus, the digital interface apparatus of the flat panel display device according to the present invention can avoid EMI and PCB design problems caused by an increase in the number of transfer lines because the timing controller 10 transfers the clock-embedded transfer data to the plurality of data ICs D-IC1 to D-IC8 in a point-to-point manner, so that the number of transfer lines can be reduced, as compared to that of a multi-drop system. It is also possible to avoid erroneous data sampling caused by a failure of clock detection, a clock delay, or an increase in data transfer frequency because each of the data ICs D-IC1 to D-IC8 can stably detect the clock from the transfer data, in response to the clock enable signal from the timing controller 10.

Figure 4:
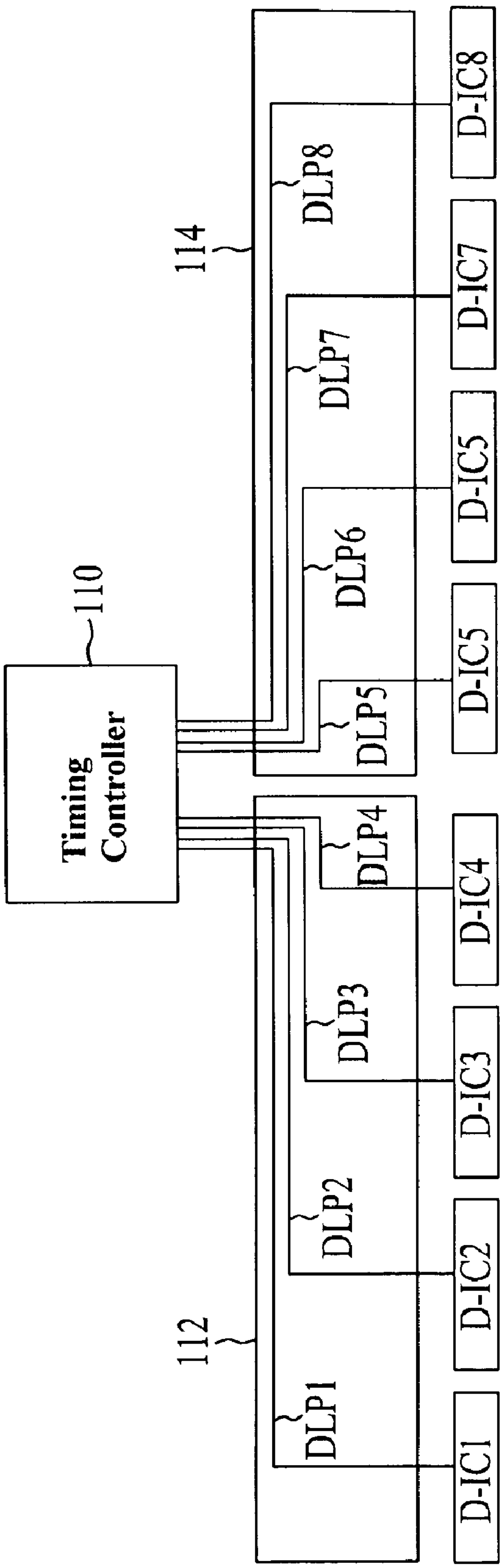
FIG. 4 is a block diagram schematically illustrating an apparatus for data interface of a flat panel display device in accordance with another embodiment of the present invention.

FIG. 4 is a block diagram schematically illustrating an apparatus for data interface of a flat panel display device in accordance with a second embodiment of the present invention.

The data interface apparatus of the flat panel display device shown in FIG. 4 includes a timing controller 110, and a plurality of data ICs D-IC1 to D-IC8 connected to the timing controller 110 via a plurality of data transfer line pairs DLP1 to DLP8 in a point-to-point manner, respectively. Each of the data ICs D-IC1 to D-IC8 independently generates a clock mask signal, to detect a clock embedded in transfer data. In this case, accordingly, the enable transfer line pairs CLP1 and CLP2 used to transfer clock enable signals in the case of FIG. 1 may be dispensed with. Accordingly, it is possible to further reduce the number of transfer lines.

The data ICs D-IC1 to D-IC8 are grouped into two groups, namely, a first group including the data ICs D-IC1 to D-IC4 and a second group including the data ICs D-IC5 to D-IC8. Similarly, the data transfer line pairs DLP1 to DLP8 are grouped into two groups, namely, a first group including the data transfer line pairs DLP1 to DLP4 and a second group including the data transfer line pairs DLP5 to DLP8. The first-group data transfer line pairs DLP1 to DLP4 connect the first-group ICs D-IC1 to D-IC4 to the timing controller 110, respectively, whereas the second-group data transfer line pairs DLP5 to DLP8 connect the second-group ICs D-IC5 to D-IC8 to the timing controller 110, respectively. The first-group data transfer line pairs DLP1 to DLP4 are arranged on a first PCB 112, whereas the second-group data transfer line pairs DLP5 to DLP8 are arranged on a second PCB 114. The timing controller 110 embeds clocks in data, and transfers the clock-embedded data to the data ICs D-IC1 to D-IC8 via the data transfer line pairs DLP1 to DLP8, respectively. Accordingly, it is unnecessary to use separate clock transfer line pairs. The timing controller 110 converts the clock-embedded transfer data into a differential signal having the form of an LVDS or mini-LVDS, and transfers the differential signal in a serial manner. Accordingly, each of the data transfer line pairs DLP1 to DLP8 includes only two transfer lines for supplying differential signals.

Each of the data ICs D-IC1 to D-IC8 recovers transfer data from the differential signal independently received from the timing controller 110 via the corresponding data transfer line pair DLP, in accordance with the voltage polarity of the received differential signal, and then separates and detects a first clock and data from the recovered transfer data, using a clock mask signal independently generated in the data IC. Thereafter, the data IC multiplies the frequency of the detected first clock, to recover a second clock. Using the recovered second clock, the data IC samples the data, and then latches the sampled data. Using the latched data, the data IC then drives corresponding data lines of a display panel.

Figure 5:
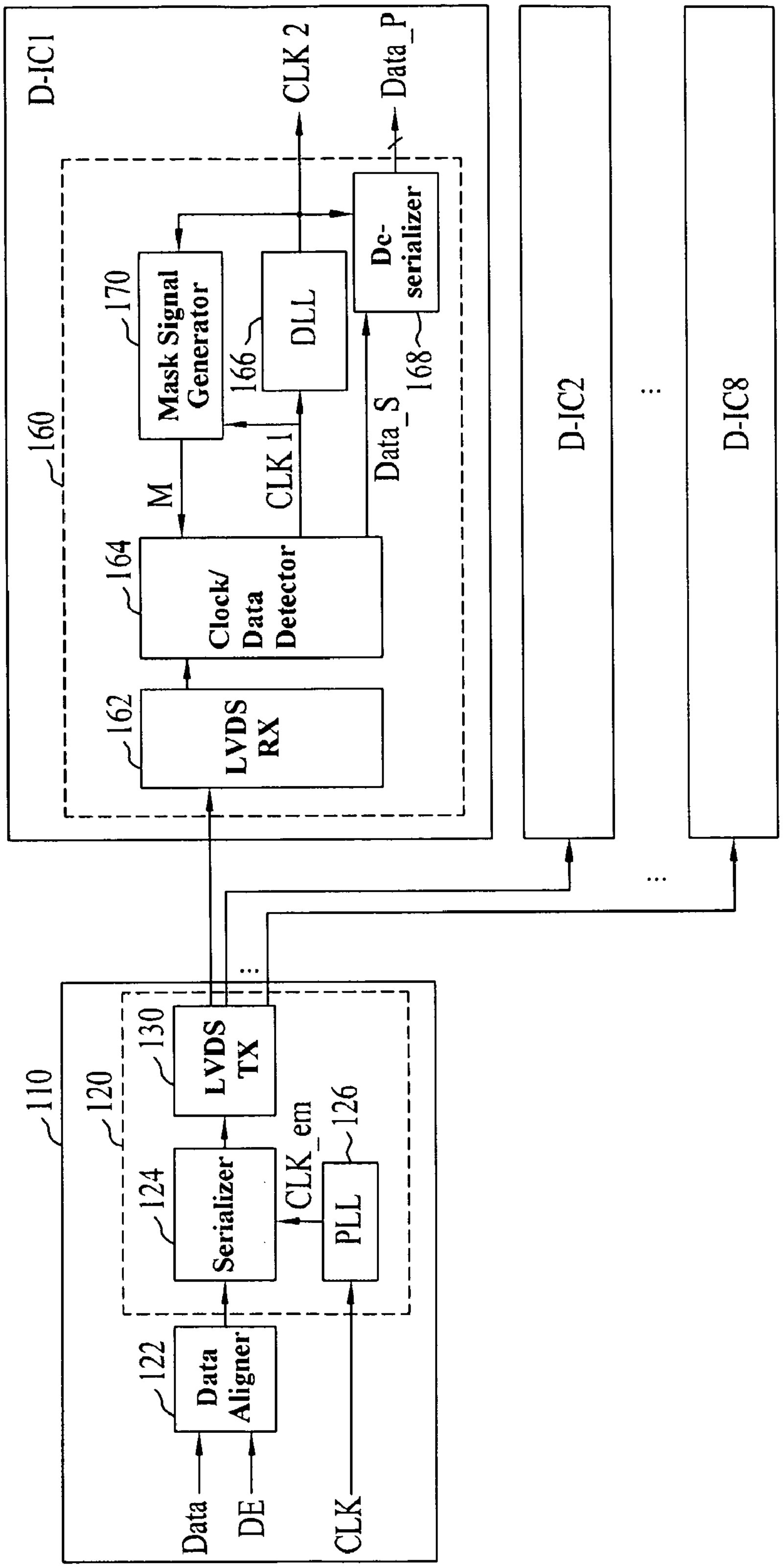
FIG. 5 is a block diagram illustrating a timing controller and data driving ICs shown in FIG. 4.
Figure 6:
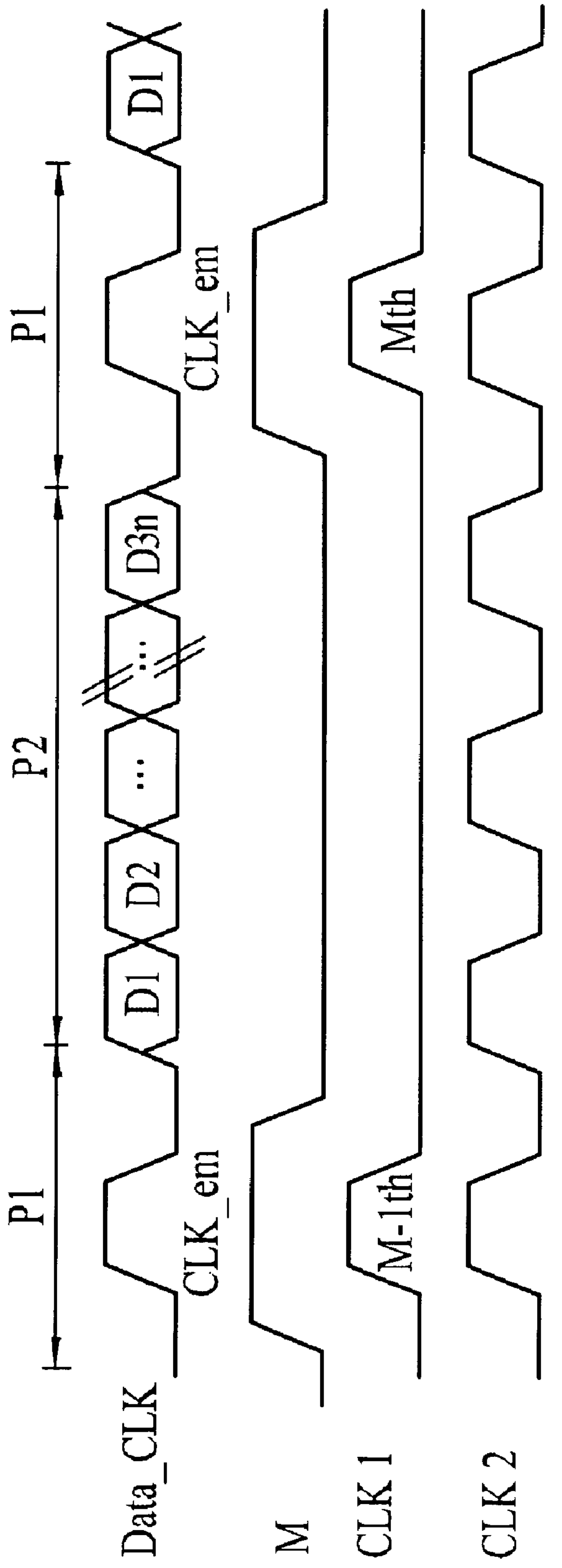
FIG. 6 is a waveform diagram illustrating waveforms of signals mainly used in a driving operation of the data interface apparatus shown in FIG. 5.

FIG. 5 is a block diagram illustrating an internal circuit of the data interface apparatus shown in FIG. 4. FIG. 6 is a waveform diagram illustrating waveforms of signals mainly used in a driving operation of the data interface apparatus shown in FIG. 5.

The data interface apparatus shown in FIG. 5 includes a transmitter unit 120 including a serializer 124 and a PLL 126 built in an output stage of the timing controller 110, to embed clocks in data, and thus to transfer the clock-embedded data, and receiver units 160 each including a clock/data detector 164, a DLL 166, a deserializer 168, and a mask signal generator 170 built in an input terminal of a corresponding one of the data ICs D-IC1 to D-IC8, to separate the clocks and data from the data received from the transmitter unit 120. The transmitter unit 120 also includes an LVDS transmitter 130 for converting the clock-embedded data into a differential signal, and outputting the differential signal. Each receiver unit 160 also includes an LVDS receiver 162 for recovering the clock-embedded data from the differential signal received from the transmitter unit 120, and outputting the recovered data.

A data aligner 122, which is included in the timing controller 110, aligns pieces of digital data input in respective enable periods of a data enable signal DE, and outputs the aligned digital data to the transmitter unit 120. In particular, where the transmitter unit 120 transfers data in a point-to-point manner, the data aligner 122 sorts the digital data pieces as data to be supplied to respective data ICs D-IC1 to D-IC8, and the sorted digital data to the serializer 124 of the transmitter unit 120.

The PLL 126 frequency-divides an input dot clock CLK by a predetermined value, to generate an embedding clock CLK_em to be embedded in the transfer data, and supplies the generated embedded clock CLK_em to the serializer 124.

The serializer 124 converts data transferred from the data aligner 122 in a parallel manner into serial data, embeds the embedding clock CLK_em received from the PLL 126 in the serial data, and then supplies the resultant data to the LVDS transmitter 130. In this case, the serializer 124 converts pieces of parallel data input in a separate state while corresponding to respective data ICs D-IC1 to D-IC8 into pieces of serial data, respectively, embeds the embedding clock CLK_em from the PLL 126 between successive ones of the serial data pieces, and supplies the resultant data to the LVDS transmitter 130. For example, the serializer 124 embeds a preamble signal including the embedding clock CLK_em in a period P1 preceding a period P2, in which bits D1 to D3*n* of one pixel data are serially transferred, and then sequentially supplies the preamble signal and the pixel data bits D1 to D3*n*, as in the case of transfer data Data_CLK shown in FIG. 6. The preamble signal includes the embedding clock CLK_em, and at least one dummy bit, namely, at least one low ("0") bit, to distinguish the embedding clock CLK_em from the pixel data. The dummy bit precedes the embedding clock CLK_em. The preamble signal may further include a flag signal arranged between the embedding clock CLK_em ("1") and the first bit D1 of the pixel data, to indicate pixel data or a data control signal. The flag signal may also be used as a source start pulse.

The LVDS transmitter 130 converts pieces of transfer data Data_CLK respectively corresponding to the data ICs D-IC1 to D-IC8 from the serializer 124 into differential signals, and supplies the differential signals to the data ICs D-IC1 to D-IC8, respectively.

The LVDS receiver 162 of the receiver unit 160 in each of the data ICs D-IC1 to D-IC8 detects the voltage polarity of the differential signal received from the transmitter unit 30 of the timing controller 110, to recover the transfer data Data_CLK, and outputs the recovered transfer data Data_CLK.

The clock/data detector 164 of the receiver unit 160 detects the first clock CLK1 and serial data Data_S from the transfer data Data_CLK from the LVDS receiver 162, in response to the clock mask signal M from the mask signal generator 170. That is, the clock/data detector 164 detects the embedding clock CLK_em from the transfer data Data_CLK in an enable period of the mask signal M, and outputs the detected embedding clock CLK_em as the first clock CLK1. The clock/data detector 164 detects the serial data Data_S included in the transfer data Data_CLK in a disable period of the clock mask signal M, and outputs the detected serial data Data_S. The clock/data detector 164 outputs pixel data, using the detected serial data Data_S. The clock/data detector 164 may additionally output a plurality of data control signals.

The DLL 166 of the receiver unit 160 multiplies the frequency of the first clock CLK1 from the clock/data detector 164 by a predetermined value, and outputs the resultant signal as the second clock CLK2. That is, the DLL 166 multiplies the frequency of the first clock CLK1 by several times to several ten times, and outputs the resultant signal as the second clock CLK2.

The deserializer 168 of the receiver unit 160 converts the serial data Data_S from the clock/data detector 164 into parallel data Data_P, using the second clock CLK2 from the DLL 166. The deserializer 168 outputs R, G, B pixel data in parallel, using the parallel data Data_P. The deserializer 168 may additionally output a plurality of data control signals.

The mask signal generator 170 generates the clock mask signal M, using the first clock CLK1 from the clock/data detector 164 and the second clock CLK2 from the DLL 166. That is, when an "M−1"-th first clock CLK1 is input, the mask signal generator 170 counts the second clock CLK2 output from the DLL 166 from the input time point of the "M−1"-th first clock CLK1 until the count value corresponds to a predetermined value, and then outputs the count value as an M-th clock mask signal M. In this case, the count value may be output after being delayed for a predetermined time, in order to secure a desired margin of the mask signal M. The predetermined value may be set to the number of bits of the pixel data transferred in the serial data transfer period P2, namely, 3*n*. The clock mask signal M is enabled in the preamble period P1, in which the embedding clock CLK_em is detected, while being disabled in the serial data transfer period P2, as shown in FIG. 6. In this case, the clock mask signal M may have an enable period longer than the embedding clock CLK_em, but shorter than the preamble period P1, in order to prevent the clock mask signal M from being overlapped with the serial data D1 to D3*n* while securing a sufficient margin to stably detect the embedding clock CLK_em. For example, the clock mask signal M has an enable period allowing the transfer data Data_CLK to be further masked before and after the embedding clock CLK_em by about a ½ clock, in addition to the embedding clock CLK_em, namely, an enable period correspond to about 2 times of the embedding clock CLK_em, as shown in FIG. 6.

Each of the data ICs D-IC1 to D-IC8 samples the pixel data output from the corresponding receiver unit 160, using the second clock CLK2 from the receiver unit 160, and latches the sampled data. Using the latched data, the data IC drives the corresponding data lines of the display panel. For example, in the case of an LCD panel, each of the data ICs D-IC1 to D-IC8 converts the latched data into an analog pixel voltage signal, and supplies the analog pixel voltage signal to the corresponding data lines.

Figure 7:
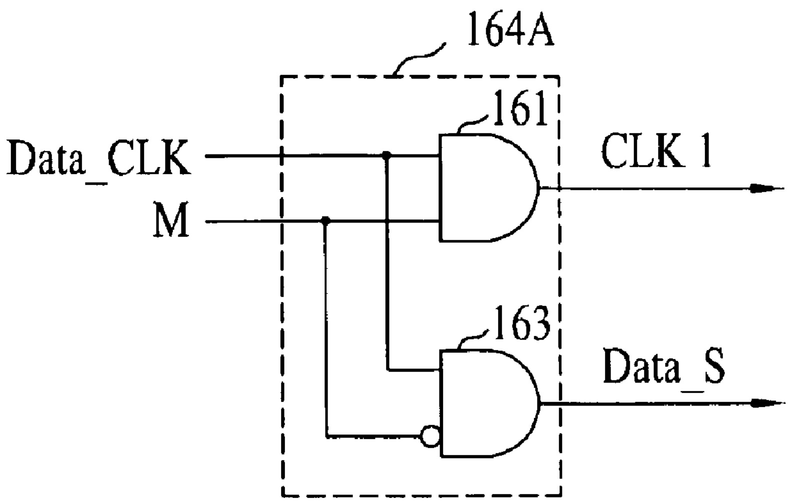
FIG. 7 is a circuit diagram illustrating an internal circuit of a clock/data detector shown in FIG. 5.

FIG. 7 illustrates an example of an internal circuit applicable to the clock/data detector shown in FIG. 5.

The clock/data detector 164A shown in FIG. 7 includes an AND gate 161 for detecting the first clock CLK1, using the transfer data Data_CLK from the LVDS receiver 162 and the clock mask signal M from the mask signal generator 170, and outputting the detected first clock CLK1, and an AND gate 163 for detecting the serial data Data_S, using the transfer data Data_CLK from the LVDS receiver 162 and the clock mask signal M from the mask signal generator 170, and outputting the detected serial data Data_S.

The AND gate 161 performs a logical AND operation on the transfer data Data_CLK and the clock mask signal M, to detect the embedding clock CLK_em transferred in the enable period of the clock mask signal M, as shown in FIG. 6, and outputs the detected embedding clock CLK_em as the first clock CLK1.

The AND gate 163 inverts the clock mask signal M, using a NOT gate. The AND gate 163 then performs a logical AND-operation on the transfer data Data_CLK and the inverted clock mask signal M, to detect the serial data Data_S transferred in the disable period of the clock mask signal M, as shown in FIG. 6, and outputs the detected serial data Data_S.

Figure 8:
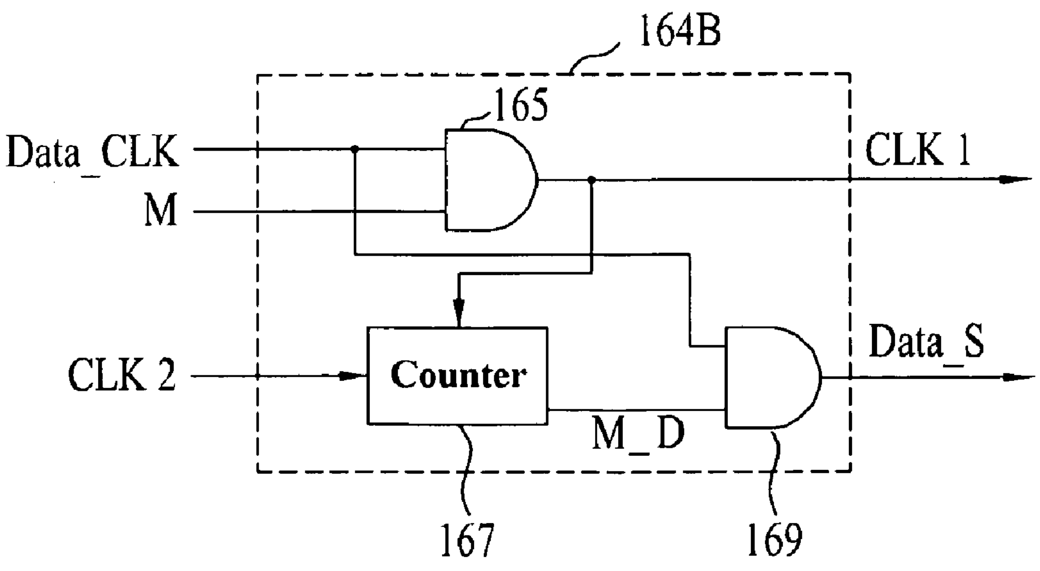
FIG. 8 is a circuit diagram illustrating another internal circuit of the clock/data detector shown in FIG. 5.
Figure 9:
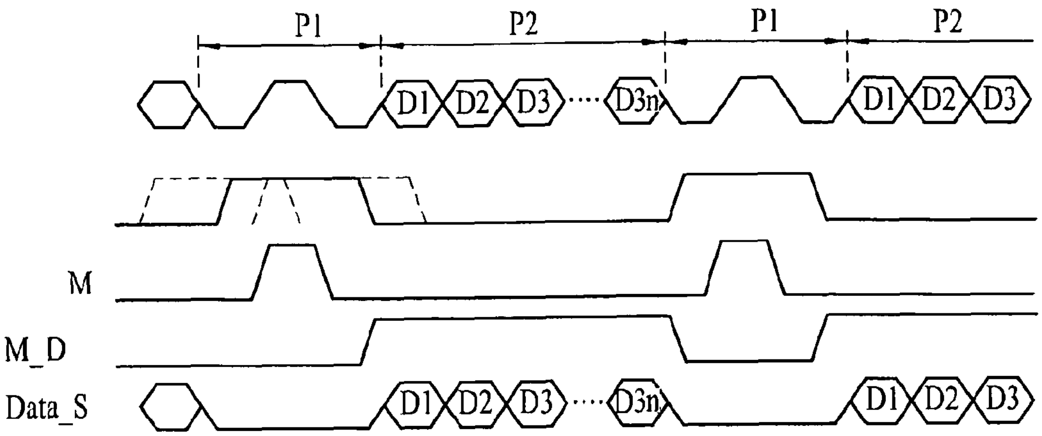
FIG. 9 is a waveform diagram illustrating waveforms of signals used in a driving operation of the clock/data detector shown in FIG. 8.

FIG. 8 illustrates another example of the internal circuit applicable to the clock/data detector shown in FIG. 5. FIG. 9 is a waveform diagram illustrating waveforms of signals used in a driving operation of a clock/data detector 164B shown in FIG. 8.

In order to avoid loss of data caused by overlapping of the mask signal M with the serial data, as indicated by a broken line in FIG. 9, the clock/data detector 164B shown in FIG. 8 generates a data mask signal M_D, using a counter 167 for counting the second clock CLK2 output from the DLL 166, detects the serial data Data_S from the transfer data Data_CLK, and outputs the detected serial data Data_S.

An AND gate 165 performs a logical AND-operation on the transfer data Data_CLK and the clock mask signal M, to detect the embedding clock CLK_em transferred in the enable period of the clock mask signal M, as shown in FIG. 9, and outputs the detected embedding clock CLK_em as the first clock CLK1.

In response to the first clock CLK1 from the AND gate 165, the counter 167 counts the second clock CLK2 output from the DLL 166 until the count value corresponds to a predetermined value, for example, the number of bits of the pixel data, namely, D3*n*, to generate the data mask signal M_D, which is enabled only in the serial data transfer period P2, as shown in FIG. 9.

An AND gate 169 ANDs the transfer data Data_CLK and the data mask signal M_D from the counter 167, to detect the serial data Data_S transferred in the enable period of the data mask signal M_D, as shown in FIG. 9, and then outputs the detected serial data Data_S. Accordingly, it is possible to avoid loss of data even when the clock mask signal M is overlapped with the serial data, as indicated by the broken line in FIG. 9.

Figure 10:
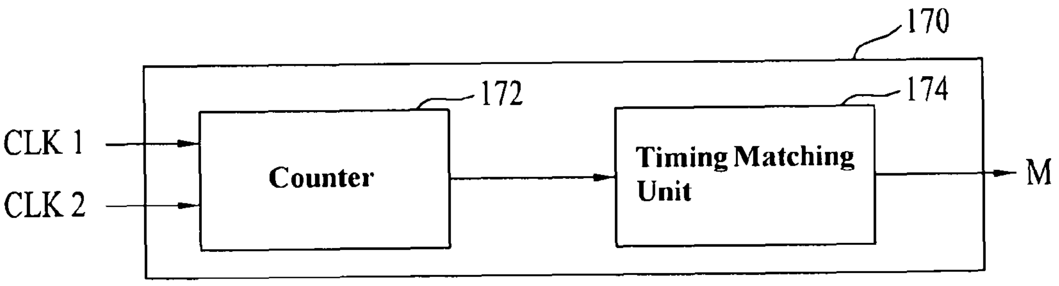
FIG. 10 is a block diagram illustrating an internal circuit of a mask signal generator shown in FIG. 5.
Figure 11:
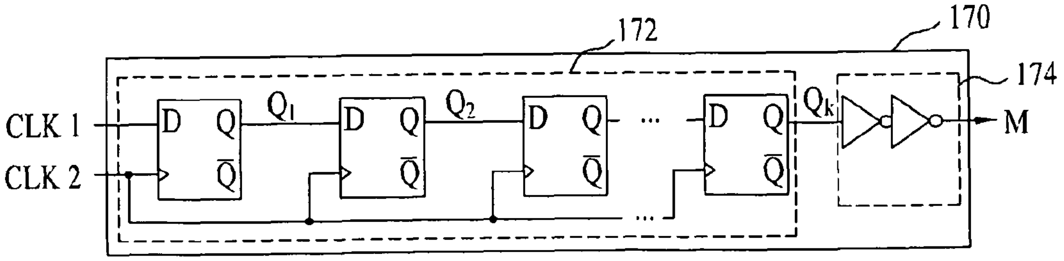
FIG. 11 is a circuit diagram illustrating the internal circuit of the mask signal generator shown in FIG. 10.
Figure 12:
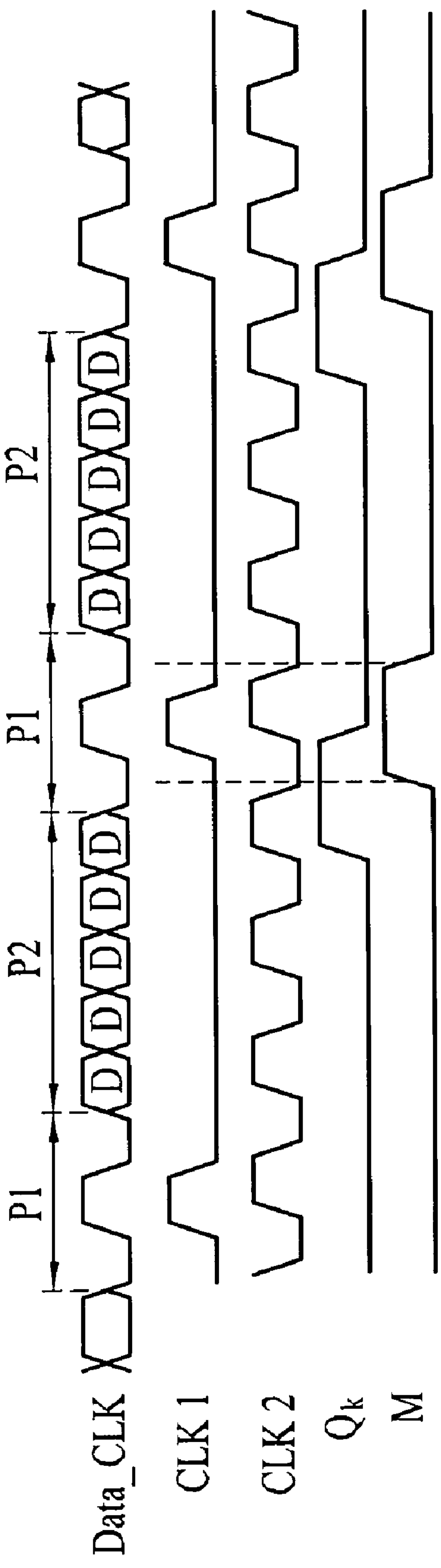
FIG. 12 is a waveform diagram illustrating waveforms of signals used in a driving operation of the mask signal generator shown in FIG. 11.

FIG. 10 illustrates an example of an internal circuit applicable to the mask signal generator shown in FIG. 5. FIG. 11 illustrates a detailed circuit of the mask signal generator shown in FIG. 10. FIG. 12 is a waveform diagram illustrating waveforms of signals used in a driving operation of the mask signal generator shown in FIG. 11.

The mask signal generator 170 shown in FIGS. 10 and 11 includes a counter 172 and a timing matching unit 174.

When the first clock CLK1 from the clock/data detector 164 is input, the counter 172 starts a counting operation. The counter 172 counts the second clock CLK2 from the DLL 166 for a predetermined time, and then outputs a count signal Qk. The timing matching unit 174 delays the count signal Qk from the counter 172, and outputs the resultant signal as a clock mask signal M. For example, when it is assumed that data of "k+1" bits is transferred in the data transfer period P2, as shown in FIG. 12, the counter 172 may include a shift register including k D-flip-flops cascade-connected to an input line for the first clock CLK1 while being connected in common to an input line for the second clock CLK2. When the first clock CLK1 is input, the counter 172, which includes k D-flip-flops, counts the second clock CLK2 until the count value corresponds to "k", and then outputs the count signal Qk. A plurality of delays, which constitute the timing matching unit 174, delay the count signal Qk for a period corresponding to the number of the delays, to output the clock mask signal M, which is enabled only in the preamble period P1, as shown in FIG. 12.

Figure 13:
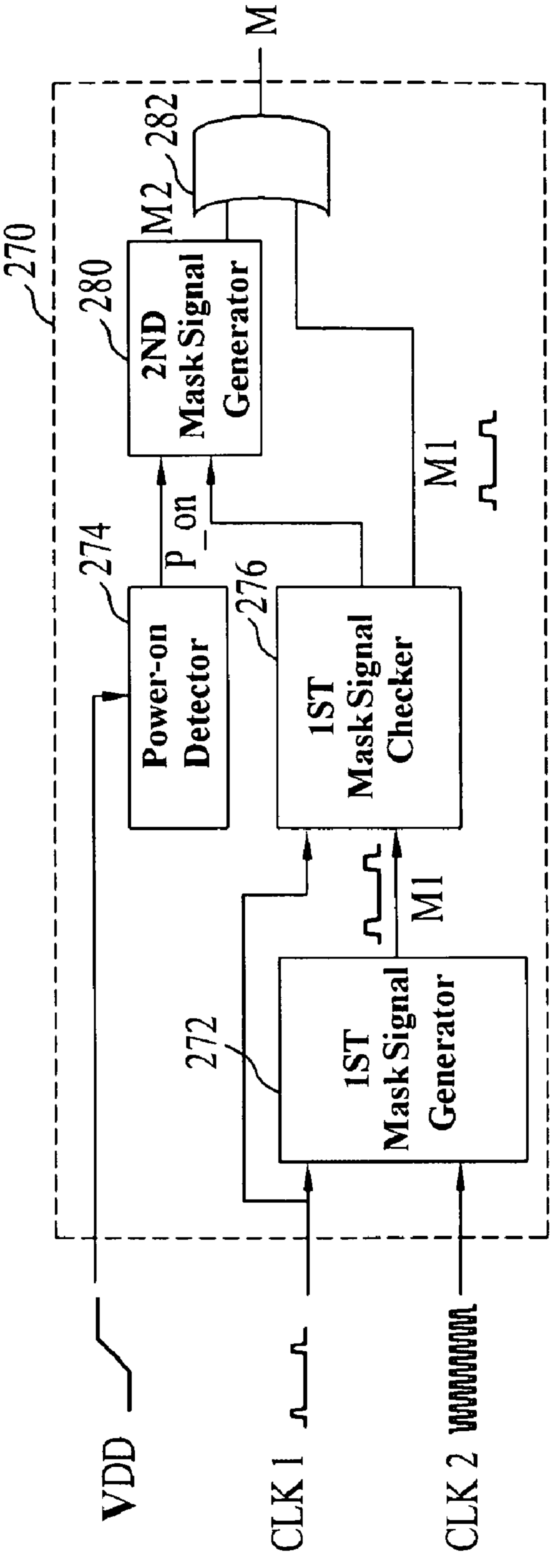
FIG. 13 is a block diagram illustrating another example of the internal circuit of the mask signal generator shown in FIG. 5.

FIG. 13 illustrates another example of the internal circuit applicable to the mask signal generator shown in FIG. 5.

In order to eliminate an unstable period from the clock mask signal M, and thus to output a stable clock mask signal M, the mask signal generator 270 shown in FIG. 13 includes a first mask signal generator 272, a first mask signal checker 276, a power-on detector 274, a second mask signal generator 280, and an OR gate 282.

Similarly to the mask signal generator 170 shown in FIG. 5, the first mask signal generator 272 generates a first clock mask signal M1, using the first clock CLK1 from the clock/data detector 164 and the second clock CLK2 from the DLL 166. That is, when the first clock CLK1 is input, the mask signal generator 272 counts the second clock CLK2 output from the DLL 166 from the input time point of the first clock CLK1 until the count value corresponds to a predetermined value, and then outputs the resultant count signal as a first clock mask signal M1. In this case, the count signal may be output as the first mask signal M1 after being delayed for a predetermined time, in order to secure a desired margin of the first mask signal M1 and to achieve desired timing matching of the first mask signal M1. As described above, the first clock mask signal M1 is enabled in the preamble period P1, in which the embedding clock CLK_em is detected, while being disabled in the serial data transfer period P2.

The first mask signal checker 276 checks whether or not the first clock mask signal M1 from the first mask signal generator 272 is normal. When it is determined that the first clock mask signal M1 is normal, the first mask signal checker 276 outputs the normal first clock mask signal M1 to the OR gate 282. On the other hand, when it is determined that the first clock mask signal M1 is abnormal, the first mask signal checker 276 disables the first clock mask signal M1, and outputs an abnormality period detect signal to the second mask signal generator 280. The first mask signal checker 276 counts the number of first clocks CLK1 in a masking period of the first clock mask signal M1, namely, an enable period of the first clock mask signal M1, to check whether or not the first clock mask signal M1 is normal. That is, when the number of counted first clocks CLK1 is "1", the first mask signal checker 276 determines that the first clock mask signal M1 is normal. In this case, the first mask signal checker 276 outputs the first clock mask signal M1 to the OR gate 282. On the other hand, when the number of counted first clocks CLK1 is not "1", the first mask signal checker 276 determines that the first clock mask signal M1 is abnormal. In this case, the first mask signal checker 276 outputs an abnormality period detect signal to the second mask signal generator 280, and disables the first clock mask signal M1.

The power-on detector 274 monitors a drive voltage VDD input from a voltage source for the data ICs, to detect a power-on point of the display device, and outputs a power-on detect signal P_on.

When the abnormality period detect signal from the first mask signal checker 276 is input, the second mask signal generator 280 outputs a second clock mask signal M2, which is maintained in a masking (enable) state for a predetermined period. When the power-on detect signal P_on from the power-on detector 274 is input, the second mask signal generator 280 also outputs the second clock mask signal M2, which is maintained in the masking state for the predetermined period, in order to mask an initial period, in which the driving operation of the display device may be unstable.

The OR gate 282 performs a logical OR-operation on ORs the first clock mask signal M1 from the first mask signal checker 276 and the second clock mask signal M2 from the second mask signal generator 280, and outputs the resultant signal as the clock mask signal M. Thus, the OR gate 282 may output the first clock mask signal M1 as the clock mask signal M in a normal period, while outputting the second clock mask signal M2 as the clock mask signal M in an abnormal period.

Thus, the mask signal generator 270 may output the first clock mask signal M1 as the clock mask signal M in a normal period, while outputting the second clock mask signal M2 as the clock mask signal M in an abnormal period, by generating the first clock mask signal M1, using the first and second clocks CLK1 and CLK2, and then checking whether or not the first clock mask signal M1 is normal.

Figure 14:
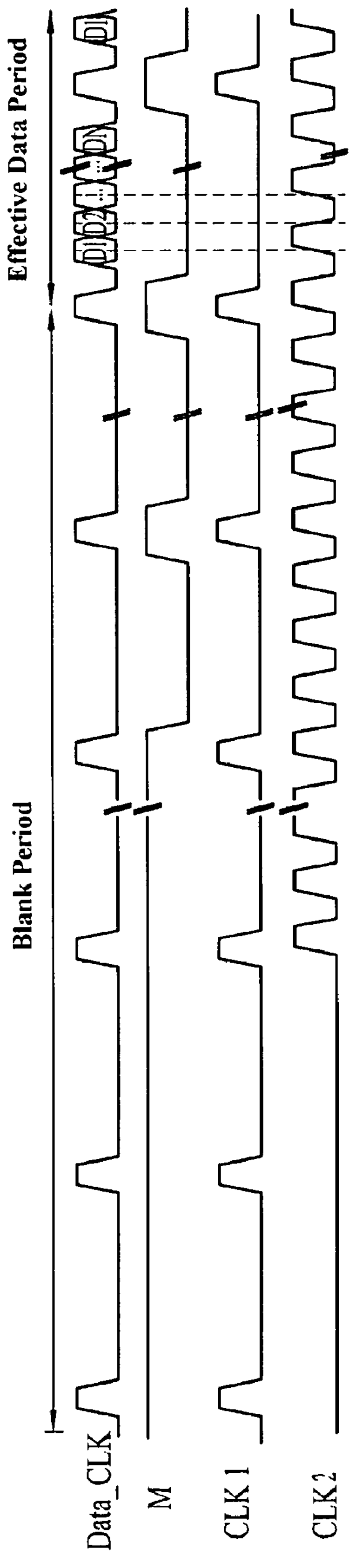
FIG. 14 is a waveform diagram illustrating waveforms of signals used in a driving operation of the mask signal generator shown in FIG. 13.

The clock mask signal M output from the mask signal generator 270 may have an abnormal period, in which the clock mask signal M is locked in an enable state, and a normal period, in which the clock mask signal M periodically repeats an enable state and a disable state, as shown in FIG. 14. The abnormal period of the clock mask signal M includes the initial period, in which the driving operation of the display device is unstable. The initial period starts from the power-on point of the display device. The clock mask signal M also has a mask locking period in which the mask signal generator 270 locks the clock mask signal M in an enable state for a predetermined time within a blank period, in which no effective data is supplied, and then prepares a normal clock mask signal M while repeatedly detecting stable first and second clocks CLK1 and CLK2.

To this end, the transmitter 120 of the timing controller 110 shown in FIG. 5 periodically embeds the embedding clock CLK_em even in the blank period, to supply the embedding clock CLK_em even in the blank period. The clock/data detector 164 of the receiver unit 160 in each data IC D-IC detects a first clock CLK1 identical to the embedding clock CLK_em in the mask locking period, in which the clock mask signal M from the mask signal generator 270 is locked in an enable state. The clock/data detector 164 then multiplies the frequency of the first clock CLK1, and outputs the resultant signal as a second clock CLK2. Accordingly, the mask signal generator 270 can output a stable clock mask signal M periodically repeating an enable state and a disable state, using the first and second clocks CLK1 and CLK2 stably repeated within the blank period. Thus, the clock/data detector 164 can stably detect the first clock CLK1 and data in the effective data period following the blank period, using the clock mask signal M. If the initial driving operation starts in the effective data period, the clock mask signal M may be unstable in the initial effective data period. In this case, however, the clock mask signal M is stabilized in the next blank period by virtue of the above-described mask locking period. Accordingly, the clock mask signal M may normally operate after the initial effective data period.

Figure 15:
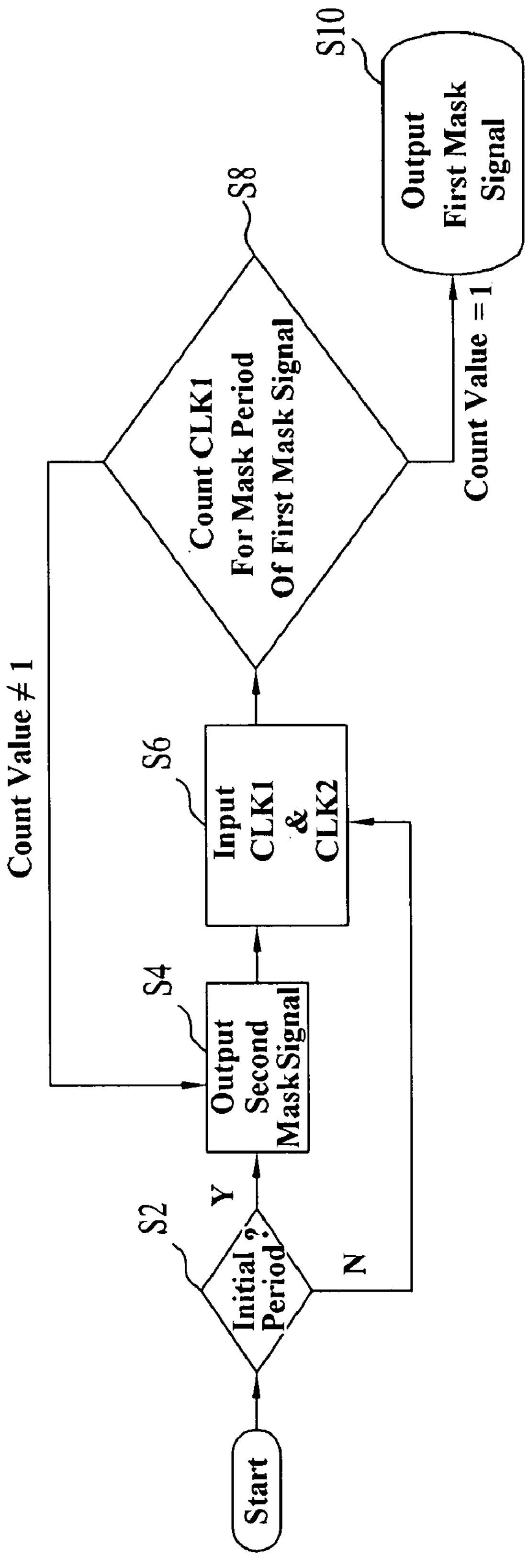
FIG. 15 is a flow chart illustrating sequential steps of a method for driving the mask signal generator, as shown in FIG. 14.
Figure 16:
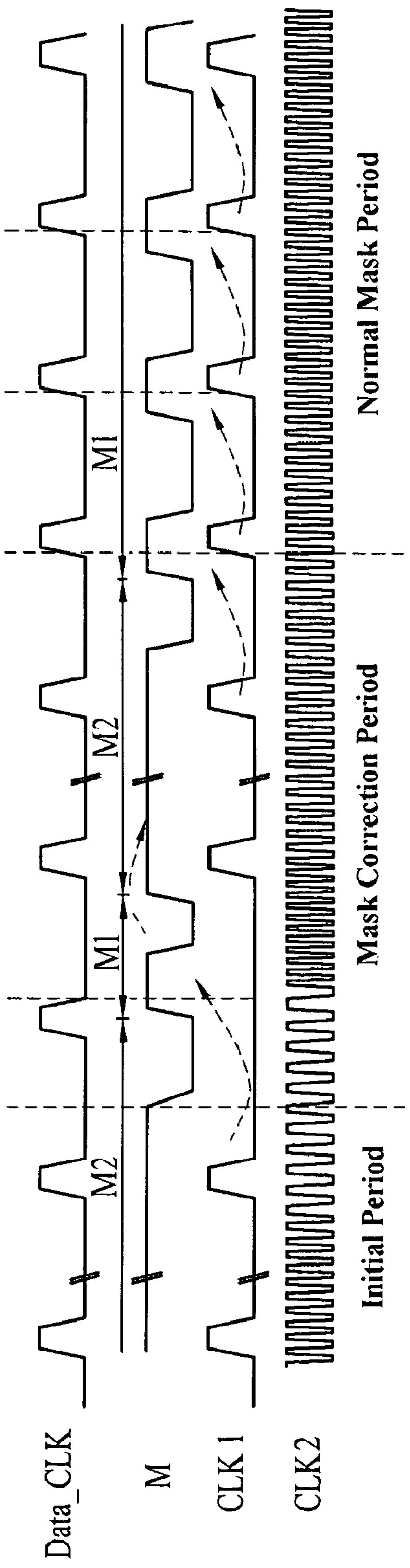
FIG. 16 is a waveform diagram illustrating a mask signal correction procedure in the mask signal generator shown in FIG. 13.

FIG. 15 is a flow chart illustrating sequential steps of a method for generating the clock mask signal M in the mask signal generator 270, as shown in FIG. 14. FIG. 16 is a waveform diagram illustrating a procedure for correcting the clock mask signal M from an abnormal second clock mask signal M2 to a normal first clock mask signal M1.

When a power-on detect signal P_on from the power-on detector 274 is input as the display device is powered on, the second mask signal generator 280 determines the current period as an initial period (S2), and then outputs a second clock mask signal M2, which is disabled after being maintained in an enable state for a predetermined time, through the OR gate 282, as a clock mask signal M (S4).

Using the clock mask signal M output from the mask signal generator 270, the clock/data detector 164 shown in FIG. 5 detects a first clock CLK1 from transfer data Data_CLK. The DLL 166 multiplies the frequency of the first clock CLK1, and outputs the resultant signal as a second clock CLK2. The mask signal generator 270 receives the first and second clocks CLK1 and CLK2 (S6). Even when it is determined at step S2 that the current period is not the initial period, step S6 is executed.

The first mask signal generator 272 generates a first clock mask signal M1, using the first and second clocks CLK1 and CLK2, and outputs the first clock mask signal M1. The first signal checker 276 counts the first clock CLK1 for the enable period of the first clock mask signal M1, namely, a masking period, to check whether the first clock mask signal M1 is normal (S8). When the count value is not "1", the first signal checker 276 determines that the first clock mask signal M1 is abnormal, and outputs an abnormality period detect signal to the second mask signal generator 280, thereby causing the second mask signal generator 280 to output a second output mask signal M2.

When a count value of "1" is generated in accordance with repetition of steps S6 and S8, the first signal checker 276 determines that the first clock mask signal M1 is normal. In this case, the first signal checker 276 causes the first clock mask signal M1 to be output via the OR gate 282, as a clock mask signal M (S10).

The above steps are repeated to output the first clock mask signal M1 whenever the first signal checker 276 determines that the first clock mask signal M1 is normal. When the first clock mask signal M1 is determined to be abnormal, a correction period is executed to correct the clock mask signal M from the second clock mask signal M2 to the first clock mask signal M1.

As apparent from the above description, the digital interface apparatus of the flat panel display device according to the present invention can avoid EMI and PCB design problems caused by an increase in the number of transfer lines because the timing controller 10 transfers the clock-embedded transfer data to the plurality of data ICs D-IC1 to D-IC8 in a point-to-point manner, so that the number of transfer lines can be reduced, as compared to that of a multi-drop system. It is also possible to avoid erroneous data sampling caused by a failure of clock detection, a clock delay, or an increase in data transfer frequency because each of the data ICs D-IC1 to D-IC8 independently generates the clock mask signal so that it can achieve a stable clock detection.

In the apparatus and method for data interface of a flat panel display device according to the present invention, it is possible to avoid EMI and PCB design problems caused by an increase in the number of transfer lines because the timing controller transfers the clock-embedded transfer data to the plurality of data integrated circuits (ICs) in a point-to-point manner, so that the number of transfer lines can be reduced, as compared to that of a multi-drop system.

Also, it is also possible to avoid erroneous data sampling caused by a failure of clock detection, a clock delay, or an increase in data transfer frequency because each of the data ICs stably detect the clock from the transfer data, in response to the clock enable signal from the timing controller.

It is also possible to avoid erroneous data sampling caused by a failure of clock detection, a clock delay, or an increase in data transfer frequency because each of the data ICs independently generates a stable clock mask signal in a blank period so that it can achieve a stable clock detection, using the clock mask signal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for data interface of a flat panel display device comprising:

a transmitter unit built in a timing controller, to transmit transfer data with an embedding clock embedded between successive pieces of data, and a clock enable signal to indicate the embedding clock; and receiver units respectively built in a plurality of data integrated circuits connected to the timing controller, to separate and detect the embedding clock and the data from the transfer data, in response to the clock enable signal, wherein the transmitter unit comprises:

a frequency divider for frequency-dividing a dot clock, to supply the embedding clock and the clock enable signal, wherein the clock enable signal precedes the embedding clock by one clock, to indicate whether or not the embedding clock exists;

a serializer for converting pieces of input parallel data into pieces of serial data, embedding the embedding clock between successive ones of the serial data pieces, and supplying the resultant data as transfer data to be supplied to each of the data integrated circuits; and a differential signal transmitter for converting the transfer data and the clock enable signal into differential signals, respectively, and transmitting the differential signals, wherein the receiver unit comprises:

a differential signal receiver for recovering the transfer data and the clock enable signal, using the differential signals received from the transmitter unit;

a clock/data detector for separating and detecting a first clock corresponding to the embedding clock and the serial data from the transfer data, in response to the clock enable signal, wherein the clock/data detector detects the embedding clock from the transfer data, using the clock enable signal as a trigger signal, and outputs the detected embedding clock as the first clock;

a frequency multiplier for multiplying a frequency of the first clock, to output a second clock; and a deserializer for converting the serial data into parallel data, using the second clock, and outputting the parallel data.

2. The apparatus according to claim 1, wherein the transfer data includes a preamble signal including the embedding clock, and the data;

the preamble signal further includes a dummy bit for distinguishing the embedding clock from the data and a flag signal indicating whether the data is pixel data or a data control signal; and the clock enable signal has an enable period just preceding the embedding clock, to indicate the embedding clock.

3. A method for data interface of a flat panel display device, comprising:

frequency-dividing an input clock, thereby generating an embedding clock and a clock enable signal to indicate the embedding clock, wherein the clock enable signal precedes the embedding clock by one clock, to indicate whether or not the embedding clock exists;

converting pieces of parallel data into pieces of serial data, embedding the embedding clock between successive ones of the serial data pieces, and supplying the resultant data as transfer data;

converting the transfer data and the clock enable signal into differential signals, respectively, and transmitting the differential signals;

recovering the transfer data and the clock enable signal, using the transmitted differential signals;

separating and detecting a first clock corresponding to the embedding clock and the serial data from the recovered transfer data, in response to the recovered clock enable signal as a trigger signal;

multiplying a frequency of the first clock, thereby outputting a second clock; and converting the serial data into parallel data, and outputting the parallel data.

4. The method according to claim 3, wherein:

the transfer data includes a preamble signal including the embedding clock, and the data; and the preamble signal further includes a dummy bit for distinguishing the embedding clock from the data, and a flag signal indicating whether the data is pixel data or a data control signal.

* * * * *